United States Patent

[11] 3,615,797

[72] Inventors Shunzo Ohtsuka;
 Tadashi Doi, both of Wakayama-shi, Japan
[21] Appl. No. 2,358
[22] Filed Jan. 12, 1970
[23] Continuation-in-part of Ser. No. 621,793,
 Mar. 9, 1967, abandoned.
[45] Patented Oct. 26, 1971
[73] Assignee Kao Soap Co. Ltd.
 Tokyo, Japan

[54] BITUMINOUS COMPOSITIONS HAVING HIGH ADHESIVE PROPERTIES AND METHOD OF PRODUCING SAME
6 Claims, No Drawings

[52] U.S. Cl. .................................................. 106/278,
 94/20, 94/23, 252/311.5
[51] Int. Cl. .................................................. C08h 13/00,
 C08h 17/22, C08j 1/46
[50] Field of Search .................................................. 106/273,
 273 N, 277, 279–284, 14; 252/311.5; 94/20, 23

[56] References Cited
 UNITED STATES PATENTS
3,236,671 2/1966 Dybalski et al. .............. 106/277
3,466,247 9/1969 Ohtsuka et al. ................ 106/277 X Primary Examiner—Philip E. Anderson
Assistant Examiner—Joan B. Evans
Attorney—Woodhams, Blanchard and Flynn ABSTRACT: A method of making a bitumen having high adhesion properties, in which there is added to the bitumen from 0.2 to 1.0 percent, based on the weight of the bitumen, of an ethylene oxide condensate of a long chain alkyl triamine represented by the general formula:

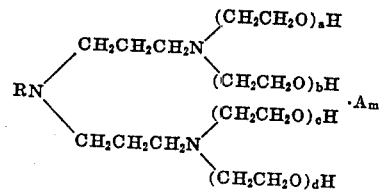

wherein R is an alkyl or alkenyl radical of eight to 22 carbon atoms; $a$, $b$, $c$ and $d$ are integers from 1 to 7 and the sum of $a+b+c+d$ is from 4 to 10; A is an organic or inorganic acid and $m$ is 0 or an integer from 1 to 3, its acid salts and mixtures thereof.

BITUMINOUS COMPOSITIONS HAVING HIGH ADHESIVE PROPERTIES AND METHOD OF PRODUCING SAME

This application is a continuation-in-part of our copending application Ser. No. 621,793, filed Mar. 9, 1967 now abandoned.

This invention relates to a method of producing bitumens having high-adhesion properties by adding to bitumens a small amount of an ethylene oxide condensate of a long chain alkyl triamine or its acid salt.

When a bitumen, such as an asphalt or tar, is used as a bonding or coating material for road pavements, waterproof embankments, roofings, paints and floor coverings, it is necessary to secure a sufficient bond between the surface of a substrate, such as an aggregate, sand, soil, cement, concrete or metal, and the bitumen. However, many times this cannot be other satisfactorily because the surface of the substance on which the bitumen is to be applied is generally hydrophilic, so that, when the surface is wet with water, the adhesion of the bitumen will be difficult to achieve and, even after the bitumen has been adhered, it will be easily stripped off by the action of rain water, ground water or water contained in the aggregate itself.

In order to improve such property and to obtain a bitumen having high-adhesion properties with respect to the surface of such a substrate, it has been customary to add a small amount of a cationic surface active agent to the bitumen.

The advantages obtained by such an improvement are great. First, the step of drying in advance the substance to which the bitumen is to be applied is unnecessary. Second, it is always possible to carry out the work without same being affected by climatic conditions, such as a rainfall or a delay in drying in a cold season, for example, in road paving. Third, after the construction, the strength reduction and the destruction of the structure by the action of water can be minimized or prevented.

However, in use the bitumen is generally heated and melted at a high temperature and is often stored at a high temperature for a long time. Therefore, it is necessary that the bitumen additive used for the above-described purpose should be thermostable enough to retain its adhesion characteristics even after it has been held at a high temperature for a long time. However, the previously used additives do not well satisfy the above-mentioned thermostability requirement. For example, the effect of the use of a long chain alkyl amine or polyamine to increase the adhesion of a bitumen is already recognized. However, if it is added to a bitumen, a reaction takes place at a high temperature with an acid constituent inherently contained in the bitumen. For example, the acylation of a basic primary or secondary amino group will occur. Therefore, it will be impossible to fully achieve the effect of increasing the adhesion.

As a result of making various studies with a view to creating a bitumen additive which has both the properties of increasing adhesion and thermostability, we have made the present invention by discovering that an ethylene oxide condensate of a long chain alkyl triamine represented by the following general formula, or its acid salt, satisfies the object of the present invention:

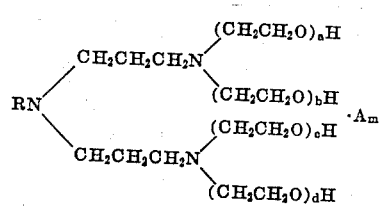

wherein R the an alkyl or alkenyl radical of eight to 22 carbon atoms; a, b, c and d are integers from one to seven and the sum of a +b +c +d is from four to 10; A is an organic or inorganic acid and m is 0 or an integer from one to three, its acid salts and equipment thereof.

The ethylene oxide condensate of the present chain alkyl triamine represented by the above-mentioned general formula or its acid salt, can be synthesized through the steps as represented by the following equation:

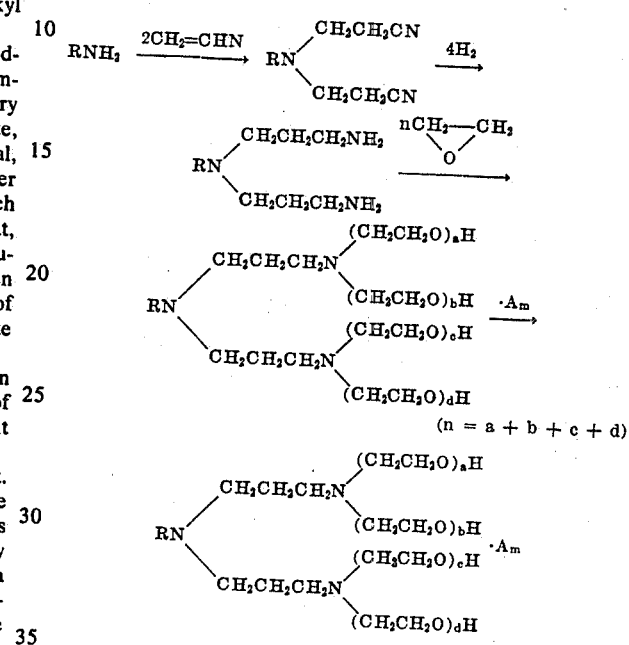

First, acrylonitrile is made to react on a long chain alkyl amine and two molecules of the acrylonitrile are added to one molecule of has amine and a dicyanoethylated alkyl amine is obtained (dicyanoethylation reaction). Second, this dicyanoethylated alkyl amine is catalytically reduced and a long chain alkyl triamine is produced (reduction reaction). Third, ethylene oxide is condensed on said triamine and the desired ethylene oxide condensate of the long chain alkyl triamine is obtained (ethylene oxide addition develops Lastly, in order to obtain its acid salt, the required amount of any acid is added to and mixed with said triamine (production of salt).

In the first dicyanoethylation reaction, the reaction should be carried out in an acidic solvent in order to add two molecules of acrylonitrile to one molecule of the alkyl amine. Accordingly, methanol, ethanol, isopropyl alcohol or water is employed as a solvent in order to enable the 2 mol addition of acrylonitrile. Further an organic or inorganic acid is added thereto to accelerate the reaction. Considering the solubility of the mixture of the alkyl amine acid salt and alkyl amine in the solvent, it relatively most preferable to use a mixture of methanol: water = 1:1 as the solvent. The amount of said solvent used is at least about 20 percent by weight (based on the weight of the alkyl amine), which is the minimum amount for dissolving the alkyl amine at 70°–75° C. In order to obtain a dicyanoethylation ratio of more than 90 percent by wt., a reaction time of more than 7 hours will be required, provided that acrylonitrile is refluxed. The details of this dicyanoethylation reaction are disclosed in U.S. Pat. No. 3,028,415.

In the second reduction reaction, Raney nickel or Raney cobalt catalyst can be preferably used as the catalyst. The amount of catalyst used is usually in the range of from 1 to 10 percent by weight (based on the weight of the amine), but, in consideration of the reduction rate per unit time and side reactions, a range of 3 to 5 percent by weight is preferable. The temperature and duration of the reaction and the hydrogen pressure are mutually interrelated to each other agglomerate that they cannot be defined simply. Although a reduction will be possible under the broad or, of conditions of a reaction life, of about 110°—250° C., a reaction time of 20 minutes to 10 hours and a hydrogen pressure of 100 to 170 kg./cm.², in view of the rate of forming the reduction product and the side reactions, the conditions of 150+ to 200° C. for the reaction temperature, 120 kg./cm.² of hydrogen pressure and 3 hours of reaction time are optimum.

The third or ethylene oxide addition reaction is carried out in a conventional way. Industrially, the addition of ethylene oxide is carried out at an elevated temperature under atmospheric or superatmospheric pressure in the presence of an alkali catalyst. As alkali catalysts, alkali metals such as metallic potassium, metallic sodium, or their hydroxides, carbonates and alcoholates of lower alcohols, such as methanol and ethanol, can be used. The catalyst is usually present in an amount of about 0.01–1.0 percent by weight, preferably 0.1–0.5 percent by weight, based on the weight of the triamine. The reaction temperature is usually in the range of 90° to 220° C. The reaction pressure will be selected usually to be more than atmospheric pressure and, in order to shorten the reaction time, a pressure within the range of 1.2 to 5.0 atoms is preferably used. Ethylene oxide can be diluted by an inert gas, such as nitrogen gas, in order to maintain the partial pressure of ethylene oxide below its explosion limit. The reaction can be carried out even under a pressure of more than 100 atms. in a continuous process.

In carrying out the ethylene oxide addition reaction, a method in which a mixture of the triamine, ethylene oxide and the catalyst is stirred under pressure, while heating it to a sufficient temperature can be used, but the most usual method is as follows:

First the triamine is charged into the vessel. It is heated for a predetermined period, while passing nitrogen gas therethrough, in order to dry the triamine completely. Ethylene oxide is then fed into the reaction vessel, simultaneously feeding nitrogen gas, if necessary. The feeding of ethylene oxide is then stopped, while stirring the reaction mixture, waiting for the start of the reaction. The start of the reaction becomes evident when a rise of the temperature and a lowering of the pressure occurs. While maintaining a constant temperature, all the ethylene oxide is fed in successively and, after that, the stirring is continued until the pressure drops below atmospheric pressure. The reaction temperature will fall gradually. The catalyst is then neutralized, if necessary, and the mixture is subjected to decoloration and filtration steps, thus obtaining the desired ethylene oxide condensate.

The number of mols of ethylene oxide added and condensed on the triamine can be determined by measuring the weight increase of the triamine.

A specific practice of the production of the ethylene oxide condensate of the long chain alkyl triamine used in the following Example 3 will now be described.

1. Dicyanoethylation reaction

Into a four-necked 500 ml. flask, provided with a cooling tube, a dropping funnel, a thermometer and a density rod, were placed 23.5 g. (Total Amine Value 213) of hardened tallow alkyl amine, 46 g. (20 percent based on amine) of glacial acetic acid, 1.3 g. (0.3 percent based on amine) of 85 percent phosphoric acid, 23.2 g. (10 percent based on amine) of methanol and 23.2 g. (10 percent based on amine) of water. The temperature of the mixture was elevated to 70°–75° C., and thereafter while stirring the mixture, 12 g. (2.5 mols based on amine) of acrylonitrile were dropped into the mixture from the dropping funnel over a period of 1 hour. After the addition of acrylonitrile was completed, the reaction was continued for 7 hours at 70°–75° C. 5 g. (1.1 mols based on the acid added) of 10 percent sodium hydroxide was added to neutralize the acid. The reaction mixture was transferred to a separating funnel and was left to stand at 60° C. for 1 hour, and the mixture separated into an oily layer and an aqueous layer. The oily layer was removed and it was subjected to topping at a reduced pressure of 45 mm. Hg and at 85° C. for 1 hour, thus removing water and low boiling ribbon and there was obtained 310 g. (95.5 percent) of the dicyanoethylated product of the oily layer. The T. Am. V (Total Amine Value by $HC10_4$ method) of this dicyanoethylated product was 152.5 and the tertiary amine quantities (tertiary Am. V.) thereof was 137.8. Since the theoretical values of said T. Am. V and tertiary tends V are both 152.0, the tertiarization ratio (tertiary Am.V./T.Am.V.×) is 90.3 percent.

2. Reduction reaction

Into an autoclave of 300 ml. capacity there was added 150 g. of dicyanoethylated hardened tallow alkyl amine (T.Am.V. 152.2), in which 4.5 g. (3 percent based on amine) of Raney nickel was dispersed. Further, 1.5 g. (1 percent based on amine) of 40 percent sodium hydroxide was added thereto and, after sealing the autoclave tightly, the temperature was elevated to 150° C., a hydrogen pressure of 120 kg./cm.² was maintained and the contents were stirred. During this period, a lowering of the hydrogen pressure occurred, whereupon further hydrogen was supplied so as to maintain the hydrogen pressure at 120 kg./cm.². The temperature was elevated over the period of 3 hours from 150° C. to 200° C., then the reduction reaction was completed. The T.Am.V. of this reduction product was 423.9 and the tertiary Am.V. was 123.9. since the theoretical values of T.Am.V. and Tertiary Am.V. of diaminopropyl hardened tallow alkyl amine are respectively 445 and 148, these results show that the reduction product had a T.Am.V. of found that percent of the theoretical value. Further, hardened tallow alkyl amine, hardened tallow alkyl propylene diamine and this reduction product were subjected to gas chromatography respectively under the same conditions (carrier: diatomaceous earth, carrier gas: from and, according to the results, the Volume of Retention of gas chromatograms having two peaks of carbon number 16 and 18 are different from each other, that is to say, the Volume of Retention becomes larger in the order of monoamine, diamine and this reduction product. This means that this reduction product has a higher molecular weight than the diamine and has amino radicals more familiar to the carrier. Thus, this reduction product is assumed to be diaminopropyl hardened tallow alkyl amine from the above Am.V. and the results of gas chromatography.

3. Ethylene oxide addition reaction

Into a four-necked 500 ml. flask provided with an ethylene oxide inlet and outlet, a thermometer and a stirring rod, there were added 200 g. of diaminopropyl hardened tallow alkyl amine (T.Am.V. 429.3, Tertiary Am.V. 123.9) and 1.2 g. (0.3 percent based on amine) of sodium hydroxide power. The mixture was heated to 170° C. and was stirred. 200 g. of ethylene oxide was blown through the inlet into the amine. After the absorption of the ethylene oxide started, the weight of ethylene oxide in the flask was measured successively and the absorption was continued until it reached a weight decrease of 112 g., which corresponds to 5 mols of ethylene oxide addition. The T.Am.V. of the obtained ethylene oxide condensate (addition product) was 275.2 and the tertiary Am.V. was 275.0.

4. Production of salt

The above addition product was heated to 60° C. and the required amount of the respective acid was added and mixed with said addition product to produce the desired acid salt.

In the present invention, if the amino group of the amine is a primary or secondary amino group, it will be acylated by reacting at a high temperature with an organic carboxylic acid, such as, for example, naphthenic acid, which is a typical acid constituent in the asphalt, and will therefore lose its basicity. However, according to our findings, the presence of the basic amino group is a requirement of the additive in order to increase the adhesion of the bitumen and the loss of the basicity causes it to lose its desired effect as an additive. On the other hand, such acylation as is mentioned above cannot occur in the tertiary amino group of the additive of the present invention. That is to say, in the present invention, the primary or secondary amino group is converted to a tertiary amino group by the condensation of ethylene oxide on it.

Further, the ethylene oxide condensate of the long chain alkyl triamine represented by the general formula mentioned above, or its acid salt, will be adsorbed and oriented on the surface of an aggregate or any other substance and will make it lipophilic. Therefore, the wetted or adhered bitumen film, once it coats the surface, cannot be stripped off by water.

The addition of the ethylene oxide condensate of the long chain alkyl triamine or its acid salt by the present invention is effective with all bitumens, such as an asphalt and tar. Further, when the additive is added at a rate in a range of 0.2 to 1.0 percent by weight to the bitumen, the improved effect can be seen. That is to say, with the addition of a small amount of the additive of the present invention, a remarkable effect of increasing the adhesion is observed and its thermostability is very high.

The present invention shall now be explained with reference to the following examples:

EXAMPLE 1

Tests were made according to the method of testing the static stripping of asphalt films (in the case of hot-mixed asphalt) as described in "Asphalt Paving Methods" published by Japan Road Association on May 1, 1961.

Aggregate samples were prepared in the following manner: 100 g. of aggregate No. 6 for roads (JIS. A-5001) (quartzites) produced in Takatsuki in Osaka Prefecture, Japan, were obtained, were well washed and were then dried in a beaker of 300 cc. capacity. The aggregate was heated for 1 hour in a thermostatically controlled oven kept at a temperature of 130° C.

Separate quantities of a naphthene base petroleum asphalt (of a penetration of 80 to 100) were each mixed with a certain amount of the additives listed below. Each of the mixtures was heated for a certain time (listed below) in a thermostatic oven at 150° C. Then 5 g. of each asphalt mixture was added to one of the above-mentioned aggregate samples. Each mixture was well stirred with a spatula for 3 minutes so that the aggregate particles were thoroughly coated on the surfaces thereof with the asphalt. Then each mixture was spread on a glass plate, was left to stand for 1 hour and was then cooled to room temperature so that the asphalt set.

Each of the above-mentioned aggregate samples was put into warm water in a thermostatic water bath kept at 80° C., was left standing for 30 minutes and was then pulled out of of water. The ratio of the area (in percent) of the asphalt coated part to the total surface area of the aggregate was observed and was identified as the coating rate in percent.

The results are tabulated in Table 1.

TABLE 1

| Additives | Adding rate in percent | Coating rate in percent after heating for the following periods | | |
| --- | --- | --- | --- | --- |
| | | 0 hour | 5 hours | 12 hours |
| Hardened tallow alkyl propylene diamine | 0.5 | 100 | 90 | 20 |
| Triamine ethylene oxide condensate [a] | 0.5 | 100 | 100 | 100 |
| Commercial antistripping agent A | 0.5 | 100 | 90 | 20 |
| Commercial antistripping agent B | 0.5 | 90 | 70 | 10 |
| No additive used | | 2 | 2 | 2 |

[a] Obtained by condensing five mols of ethylene oxide on stearyl dipropylene triamine.

EXAMPLE 2

Stripping tests were made by the same method as in Example 1 by using aggregate No. 6 for roads (JIS. A-5001) (quartzites) produced in Kochi Prefecture, Japan, and a mixed base petroleum asphalt (of a penetration of 80 to 120). The results are listed in table 2.

TABLE 2

| Additives | Adding rate in percent | Coating rate in percent after heating for the following periods | | |
| --- | --- | --- | --- | --- |
| | | 0 hour | 5 hours | 12 hours |
| The same triamine ethylene oxide condensate as in Example 1 | 0.5 | 90 | 70 | 60 |
| Commercial antistripping agent A | 0.5 | 90 | 10 | 10 |
| No additive used | | 2 | 2 | 2 |

EXAMPLE 3

The coating of aggregates with asphalt was tested according to the method of the Immersion Tray Test of the National Road Research Laboratory of Great Britain.

A fixed amount of each of the following named additives was added to separate quantities of a naphthene base petroleum asphalt (of a penetration of 80 to 100) and the mixture was heated for a fixed time (listed below) in a thermostatic oven at 150° C. Twenty-five parts of kerosene were added to 75 parts of said mixture to prepare a cutback asphalt.

Aggregate No. 5 for roads (JIS. A-5001) (quartzites) produced in Takatsuki, Osaka Prefecture, Japan, were well washed, were dried for 3 hours in a thermostatic oven at 130° C. and were then left to cool down to room temperature in a desiccator.

Asphalt films, each about 1.5 mm. thick, were made by pouring 1.5 g. of the above-mentioned cutback asphalts into a round dish of a diameter of about 13 cm. made of almite and the films were immersed in water at a depth of about 2.5 cm. at 20° C. The above-mentioned aggregates were pressed against the above-mentioned asphalt films by hand, were left standing as they were for ten minutes and were then pulled off by hand.

The ratio of the area (in percent) of the asphalt coated part to the total surface area of the parts of the aggregates in contact with the asphalt was observed and was identified as the coating rate in percent.

The results are listed in table 3.

TABLE 3

| Additives | Adding rate in percent | Coating rate in percent after heating for the following periods— | | |
| --- | --- | --- | --- | --- |
| | | 0 hour | 12 hours | 24 hours |
| Hardened tallow alkyl propylene diamine | 0.5 | 100 | 20 | 10 |
| Monooleate of the above | 0.5 | 100 | 70 | 40 |
| Triamine ethylene oxide condensate [a] | 0.5 | 100 | | 90 |
| Trihydrochloride acid salt of the above triamine ethylene oxide condensate [a] | 0.5 | 100 | 90 | 70 |
| Monooleate acid salt of the above triamine ethylene oxide condensate [a] | 0.5 | 100 | 100 | 90 |
| Commercial antistripping agent A | 0.5 | 100 | 30 | 20 |
| No additive used | | 2 | 2 | 2 |

[a] Obtained by condensing five mols of ethylene oxide on hardened tallow alkyl dipropylene triamine.

EXAMPLE 4

The same coating tests as in example 3 were carried out except that the temperature of the thermostatic oven was maintained at 180° C. at the time of heating for a fixed time (listed below) after adding the additive to the asphalt.

The results are listed in tables 4 and 5.

TABLE 4

| Additives | Adding rate in percent | Coating rate in percent after heating for the following periods— | | |
|---|---|---|---|---|
| | | 0 hour | 7 hours | 10 hours |
| Hardened tallow alkyl propylene diamine | 0.5 | 100 | | 2 |
| Triamine ethylene oxide condensate of Example 3 | 0.5 | 100 | 100 | 70 |
| Commercial antistripping agent A | 0.5 | 100 | | 10 |
| No additive used | | 2 | | 2 |

TABLE 5

| Additives | Adding rate in percent | Coating rate in percent after heating for the following periods | | |
|---|---|---|---|---|
| | | 0 hour | 3 hours | 10 hours |
| Triamine ethylene oxide condensate in Example 3 | 0.75 | 100 | 100 | 90 |
| Do | 0.5 | 100 | 100 | 70 |
| Do | 0.3 | 100 | 90 | 20 |
| No additive used | | 2 | 2 | 2 |

As will be understood from the above examples, the conventionally used bituminous additives show the effect of increasing the adhesion only when they are not subjected to severe heating, for example, as in the case of a bitumen emulsion, cutback asphalt or cutback tar applied a ambient temperature. However, such a method of application includes only a part of the practical application processes. On the other hand, when an asphalt heated at about 150° C. for a long time was used, for example, as is the case in making a hot-mixed asphalt pavement, a bitumen of high adhesion properties can be obtained only by the method of the present invention. Further, since the hot-mix method of application is the most commonly used practical process of application, the effect of the present invention is great.

The embodiments of the invention in which an exclusive property or privilege is claimed are defined as follows:

1. A method of producing bitumens having high adhesion characteristics, which comprises adding to a bitumen from about 0.2% to about 1.0% by weight, based on the weight of the bitumen, of an additive selected from the group consisting of an ethylene oxide condensate of a long chain alkyl triamine represented by the following general formula:

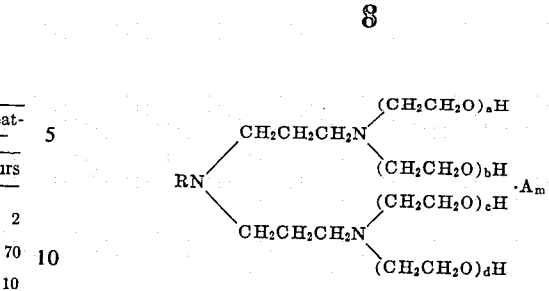

wherein R is an alkyl or alkenyl radical of eight to 22 carbon atoms, $a$, $b$, $c$ and $d$ each is an integer from one to seven and the sum of $a+b+c+d$ is four to 10, A is selected from the group consisting of oleic acid and hydrochloric acid and $m$ is 0 or an integer from one to three, and mixtures thereof.

2. A method as claimed in claim 1, wherein said additive is a stearyl dipropylene triamine-ethylene oxide condensation product, or its oleic or hydrochloric acid salt.

3. A method as claimed in claim 1, wherein said additive is ethoxylated hardened tallow alkyl dipropylene triamine, or its oleic or hydrochloric acid salt.

4. A bituminous composition having high adhesion properties comprising a bitumen and from about 0.2 percent to about 1.0 percent by weight, based on the weight of the bitumen, of an additive selected from the group consisting of an ethylene oxide condensate of a long chain alkyl triamine represented by the following general formula:

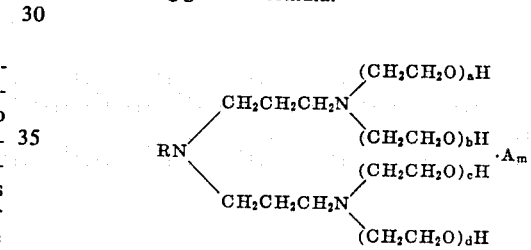

wherein R is an alkyl or alkenyl radical of eight to 22 carbon atoms, $a$, $b$, $c$ and $d$ each is an integer from one to seven, and the sum of $a+b+c+d$ is four to 10, A is selected from the group consisting of oleic acid and hydrochloric acid and $m$ is 0 or an integer from one to three and mixtures thereof.

5. A composition as claimed in claim 4, wherein said additive is a stearyl dipropylene triamine-ethylene oxide condensation product, or its oleic or hydrochloric acid salt.

6. A composition as claimed in claim 4, wherein said additive is ethoxylated hardened tallow alkyl dipropylene triamine, or its oleic or hydrochloric acid salt.

* * * * *